United States Patent
Perlstein et al.

(10) Patent No.: US 9,477,408 B1
(45) Date of Patent: Oct. 25, 2016

(54) MEMORY SYSTEMS HAVING IMPROVED OUT-OF-ORDER EXECUTION OF COMMANDS AND METHODS FOR OPERATING THE SAME

(71) Applicant: Samsung Electronics Co., Ltd., Suwon-si, Gyeonggi-do (KR)

(72) Inventors: Amitai Perlstein, Ramat Gan (IL); Amir Bennatan, Ramat Gan (IL); Hanan Lechtman, Ramat Gan (IL); Jun Jin Kong, Yongin-si (KR); Michael Erlihson, Ramat Gan (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 8 days.

(21) Appl. No.: 14/686,391

(22) Filed: Apr. 14, 2015

(51) Int. Cl.
    *G06F 3/06* (2006.01)
(52) U.S. Cl.
    CPC ............ *G06F 3/061* (2013.01); *G06F 3/0659* (2013.01); *G06F 3/0679* (2013.01)
(58) Field of Classification Search
    None
    See application file for complete search history.

(56) References Cited

U.S. PATENT DOCUMENTS

| | | | |
|---|---|---|---|
| 7,089,369 B2 | 8/2006 | Emberling | |
| 7,679,133 B2 | 3/2010 | Son et al. | |
| 7,930,507 B2 | 4/2011 | Perry | |
| 7,979,603 B2 | 7/2011 | Yamaguchi et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,732,393 B2 | 5/2014 | Iwasaki et al. | |
| 2010/0037223 A1 | 2/2010 | Yorimitsu | |
| 2011/0233648 A1 | 9/2011 | Seol et al. | |
| 2014/0075102 A1 | 3/2014 | Oh et al. | |
| 2014/0156911 A1 | 6/2014 | Alcantara et al. | |

FOREIGN PATENT DOCUMENTS

| | | |
|---|---|---|
| JP | 20100282422 A | 12/2010 |
| KR | 20100042885 A | 4/2010 |

OTHER PUBLICATIONS

Eyee Hyun Nam et al., "Ozone (O3): An Out-of-Order Flash Memory Controller Architecture", IEEE Transactions on Computers, vol. 60, No. 5, May 2011, pp. 653-666.

*Primary Examiner* — Kevin Verbrugge
(74) *Attorney, Agent, or Firm* — Harness, Dickey & Pierce, P.L.C.

(57) ABSTRACT

A memory device controller includes a main processor and a sequencer. The sequencer is configured to: estimate a time interval required to complete execution of a set of atom commands allocated to a channel of a non-volatile memory; calculate, for each of the plurality of atom commands, an urgency value associated with completing execution of a corresponding memory command after expiration of the time interval required to complete execution of the set of atom commands allocated to the channel; schedule each of the plurality of atom commands in the set of atom commands for execution by the non-volatile memory based on the calculated urgency values; and output the plurality of atom commands to the non-volatile memory for execution in the scheduled order.

15 Claims, 9 Drawing Sheets

MEMORY SYSTEMS HAVING IMPROVED OUT-OF-ORDER EXECUTION OF COMMANDS AND METHODS FOR OPERATING THE SAME

BACKGROUND

In a conventional memory system, a device (or memory) controller schedules commands (e.g., read, write, maintenance, sector read, sector write, block erase, etc.) for execution by a storage device. In one example, the device controller schedules sector read, sector write and/or block erase commands for execution according to the time the memory commands are requested by the host (e.g., according to arrival time). In another example, the commands are scheduled according to fixed (or static) priorities assigned to each command. These conventional scheduling techniques, however, may result in some commands having abnormally high response times (also referred to as "hiccups"), which may degrade quality of service (QoS) of the memory system.

SUMMARY

At least one example embodiment provides a memory device controller including a main processor and a sequencer. The main processor is configured to allocate a set of atom commands to a channel among a plurality of channels of a non-volatile memory, the set of atom commands including a plurality of atom commands, each of the plurality of atom commands being a portion of a memory command from among a plurality of memory commands, and each of the plurality of atom commands being applicable to at least one sector of the non-volatile memory. The sequencer is configured to: estimate a time interval required to complete execution of the set of atom commands allocated to the channel; calculate, for each of the plurality of atom commands, an urgency value associated with completing execution of a corresponding memory command after expiration of the time interval required to complete execution of the set of atom commands allocated to the channel; schedule each of the plurality of atom commands in the set of atom commands for execution by the non-volatile memory based on the calculated urgency values; and output the plurality of atom commands to the non-volatile memory for execution in the scheduled order.

At least one other example embodiment provides a storage device including a non-volatile memory and a memory device controller. The non-volatile memory includes a plurality of memory channels, and is configured to execute a plurality of memory commands. The memory device controller includes a main processor and a sequencer. The main processor is configured to allocate a set of atom commands to a channel among the plurality of memory channels of the non-volatile memory, the set of atom commands including a plurality of atom commands, each of the plurality of atom commands being a portion of a memory command from among the plurality of memory commands, and each of the plurality of atom commands being applicable to at least one sector of the non-volatile memory. The sequencer is configured to: estimate a time interval required to complete execution of the set of atom commands allocated to the channel; calculate, for each of the plurality of atom commands, an urgency value associated with completing execution of a corresponding memory command after expiration of the time interval required to complete execution of the set of atom commands allocated to the channel; schedule each of the plurality of atom commands in the set of atom commands for execution by the non-volatile memory based on the calculated urgency values; and output the plurality of atom commands to the non-volatile memory for execution in the scheduled order.

At least one other example embodiment provides a storage system including a host and a storage device coupled to the host. The host is configured to generate memory commands. The storage device includes a non-volatile memory and a memory device controller coupled to the non-volatile memory. The non-volatile memory includes a plurality of memory channels, and is configured to execute a plurality of memory commands. The memory device controller includes a main processor and a sequencer. The main processor is configured to allocate a set of atom commands to a channel among the plurality of memory channels of the non-volatile memory, the set of atom commands including a plurality of atom commands, each of the plurality of atom commands being a portion of a memory command from among the plurality of memory commands, and each of the plurality of atom commands being applicable to at least one sector of the non-volatile memory. The sequencer is configured to: estimate a time interval required to complete execution of the set of atom commands allocated to the channel; calculate, for each of the plurality of atom commands, an urgency value associated with completing execution of a corresponding memory command after expiration of the time interval required to complete execution of the set of atom commands allocated to the channel; schedule each of the plurality of atom commands in the set of atom commands for execution by the non-volatile memory based on the calculated urgency values; and output the plurality of atom commands to the non-volatile memory for execution in the scheduled order.

According to at least some example embodiments, the sequencer may be further configured to aggregate a minimum execution time required to complete execution of each of the plurality of atom commands in the set of atom commands to estimate the time interval required to complete execution of the set of atom commands.

The plurality of memory commands may include at least one of a write command, a read command and a maintenance command.

The sequencer may be configured to schedule the plurality of atom commands by ordering the plurality of atom commands for execution by the non-volatile memory based on the calculated urgency values.

The sequencer may be configured to schedule the plurality of atom commands by adjusting execution priorities associated with the plurality of atom commands based on the calculated urgency values, and ordering the plurality of atom commands for execution based on the adjusted execution priorities.

The sequencer may be further configured to: compare the calculated urgency values for each of the plurality of atom commands; and order the plurality of atom commands for execution based on the comparison.

The sequencer may be configured to order the plurality of atom commands for execution such that the atom command having a highest calculated urgency value, from among the plurality of atom commands, is executed first.

According to at least some example embodiments, in response to addition of an atom command to the set of atom commands allocated to the channel, the sequencer may be further configured to: re-estimate the time interval required to complete execution of the set of atom commands allocated to the channel; re-calculate, for each of the plurality of atom commands, the urgency value associated with completing execution of the corresponding memory command after expiration of the time interval required to complete execution of the set of atom commands allocated to the channel; and re-schedule the plurality of atom commands in the set of atom commands for execution by the non-volatile memory based on the re-calculated urgency values.

The plurality of atom commands may include at least one of a sector read command, a sector write command and a block erase command.

The sequencer may be configured to schedule the plurality of atom commands in the set of atom commands allocated to the channel independent of scheduling of atom commands allocated to others of the plurality of channels of the non-volatile memory.

The main processor may be further configured to separate each of the plurality of memory commands into a plurality of atom commands.

According to at least some example embodiments, the non-volatile memory may include a three-dimensional memory array having a plurality of memory cells, wherein each of the plurality of memory cells includes a charge trap layer.

At least one other example embodiment provides a method for executing memory commands at a non-volatile memory. According to at least this example embodiment, the method includes: allocating a set of atom commands to a channel among a plurality of channels of a non-volatile memory, the set of atom commands including a plurality of atom commands, each of the plurality of atom commands being a portion of a memory command from among a plurality of memory commands, and each of the plurality of atom commands being applicable to at least one sector of the non-volatile memory; estimating a time interval required to complete execution of the set of atom commands allocated to the channel; calculating, for each of the plurality of atom commands, an urgency value associated with completing execution of a corresponding memory command after expiration of the time interval required to complete execution of the set of atom commands allocated to the channel; scheduling each of the plurality of atom commands in the set of atom commands for execution by the non-volatile memory based on the calculated urgency values; and outputting the plurality of atom commands to the non-volatile memory for execution in the scheduled order.

At least one other example embodiment provides a tangible or non-transitory computer-readable storage medium including computer-executable instructions that when executed cause a processing device to perform a method for executing memory commands at a non-volatile memory. According to at least this example embodiment, the method includes: allocating a set of atom commands to a channel among a plurality of channels of a non-volatile memory, the set of atom commands including a plurality of atom commands, each of the plurality of atom commands being a portion of a memory command from among a plurality of memory commands, and each of the plurality of atom commands being applicable to at least one sector of the non-volatile memory; estimating a time interval required to complete execution of the set of atom commands allocated to the channel; calculating, for each of the plurality of atom commands, an urgency value associated with completing execution of a corresponding memory command after expiration of the time interval required to complete execution of the set of atom commands allocated to the channel; scheduling each of the plurality of atom commands in the set of atom commands for execution by the non-volatile memory based on the calculated urgency values; and outputting the plurality of atom commands to the non-volatile memory for execution in the scheduled order.

According to at least some example embodiments, the estimating may include aggregating a minimum execution time required to complete execution of each of the plurality of atom commands in the set of atom commands to estimate the time interval required to complete execution of the set of atom commands.

The scheduling may include: adjusting execution priorities associated with the plurality of atom commands based on the calculated urgency values; and ordering the plurality of atom commands for execution based on the adjusted execution priorities.

According to at least some example embodiments, the method may further include: comparing the calculated urgency values for each of the plurality of atom commands in the set of atom commands; and ordering the plurality of atom commands for execution based on the comparing such that the atom command having the highest calculated urgency value, from among the plurality of atom commands, is executed first.

The scheduling of the plurality of atom commands in the set of atom commands allocated to the channel may be independent of scheduling of atom commands allocated to others of the plurality of channels of the non-volatile memory.

BRIEF DESCRIPTION OF THE DRAWINGS

Example embodiments will become more appreciable through the description of the drawings in which.

Figure 1:
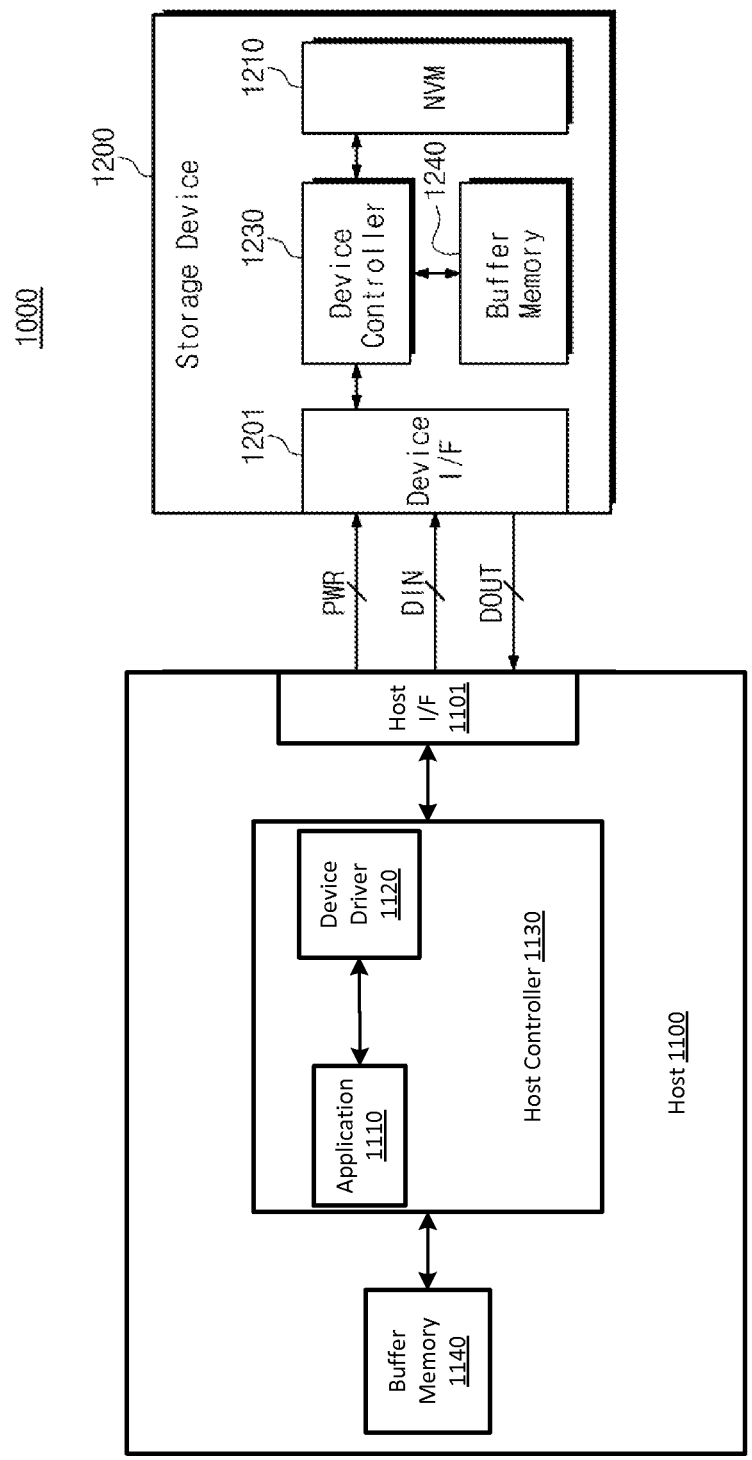
FIG. 1 is a block diagram schematically illustrating a storage system according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., non-volatile memories, universal flash memories, universal flash memory controllers, non-volatile memories and memory controllers, storage systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), System-on-Chip (SoC), field programmable gate arrays (FPGAs) computers or the like.

Further, according to one or more example embodiments, hosts, storage devices, device controllers, interfaces (host and/or device), etc. may be (or include) hardware, firmware, hardware executing software or any combination thereof. Such hardware may include one or more CPUs, SOC devices, DSPs, ASICs, FPGAs, computers, or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In a conventional memory system, a device (or memory) controller schedules commands (e.g., read, write, maintenance, sector read, sector write, block erase, etc.) for execution by a storage device. In one example, the device controller schedules commands received from a host for execution according to the time the memory commands are requested by the host (e.g., according to arrival time). In another example, the commands are scheduled according to fixed (or static) priorities assigned to each command. However, because an urgency (or cost) of a particular command may change over time, these conventional scheduling techniques may result in unacceptable response times (also referred to as "hiccups") for some commands.

One or more example embodiments provide memory systems including device controllers configured to predict urgency (e.g., future urgency or cost) values for one or more commands at a future time, rather than the time at which the commands are received. The device controller then schedules the commands for execution based on the estimated urgencies (or urgency values) at the future time.

One or more example embodiments also provide methods for executing commands at a memory system based on predicted urgency (e.g., future urgency or cost) values for commands at a future time, rather than the time at which the commands are received.

One or more example embodiments also provide tangible, non-transitory computer-readable mediums including computer-executable code that, when executed, causes a computer to perform methods for executing commands at memory systems based on predicted urgency (e.g., future urgency or cost) values for commands at a future time, rather than the time at which the commands are received.

FIG. 1 is a block diagram schematically illustrating a storage system according to an example embodiment.

Referring to FIG. 1, the storage system 1000 includes a host 1100 and a storage device 1200. The host 1100 includes: a host interface 1101; a host controller 1130; and a buffer memory 1140. The storage device 1200 includes: a device interface 1201; a non-volatile memory (NVM) 1210; a device controller (also referred to as a memory controller) 1230; and a buffer memory 1240.

The storage device 1200 and the host 1100 are connected to one another through the interfaces 1101 and 1201. The host interface 1101 and the device interface 1201 may be standardized interfaces such as a Universal Flash Storage (UFS) interface, a serial advanced technology attachment (SATA) interface, a Small Computer Small Interface (SCSI), a serial attached SCSI (SAS), etc. The host interface 1101 and the device interface 1201 are connected by data lines DIN and DOUT for exchanging data and/or signals, and by power lines PWR for providing power. In the example shown in FIG. 1, the host interface 1101 provides power to the device interface 1201 via the power line PWR.

The host controller 1130 receives data from, and sends commands (e.g., read and/or write) and/or data to, the storage device 1200 through the host interface 1101. The host controller 1130 includes an application 1110 and the device driver 1120. The application 1110 and/or the device driver 1120 may be implemented by hardware, software and/or firmware. The application 1110 may refer to one or more application programs executed by the host controller 1130 at the host 1100.

The device driver 1120 operates or controls devices attached to the host 1100 by providing a software interface to hardware devices, enabling operating systems and other host programs to access hardware functions without knowledge of precise details of the hardware being used.

The buffer memory 1140 may be used as a main memory and/or a cache memory of the host 1100. The buffer memory 1140 (e.g., synchronous random access memory (SRAM) and/or dynamic random access memory (DRAM)) may also be used as a driving memory to drive software such as the application 1110 and/or the device driver 1120.

Still referring to FIG. 1, as mentioned above, the storage device 1200 includes: a non-volatile memory (or memory device) 1210; a device controller (also referred to as a memory controller) 1230; and a buffer memory 1240. In this example, the storage device 1200 may be a data storage device based on a non-volatile memory, such as a flash memory, a magnetic random access memory (MRAM), a phase change RAM (PRAM), a ferroelectric RAM (FeRAM), etc.

The non-volatile memory may be a two-dimensional (2D) or three dimensional (3D) memory array. A 3D memory array is monolithically formed in physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

The 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Patent Application Publication No. 2011/0233648.

The device controller 1230 controls an overall operation of the non-volatile memory 1210 including, for example, write operations, read operations, erase operations, maintenance operations, encoding/decoding, error correction, etc. The device controller 1230 exchanges data and/or address information with the non-volatile memory 1210 and/or the buffer memory 1240 through an address and/or data bus. The device controller 1230 will be discussed in more detail later with regard to FIGS. 2 through 5.

The buffer memory 1240 temporarily stores data to be stored in the non-volatile memory 1210 and/or data read from the non-volatile memory 1210. The buffer memory 1240 may be implemented by a volatile and/or non-volatile memory (e.g., synchronous random access memory (SRAM) and/or dynamic random access memory (DRAM)).

Figure 2:
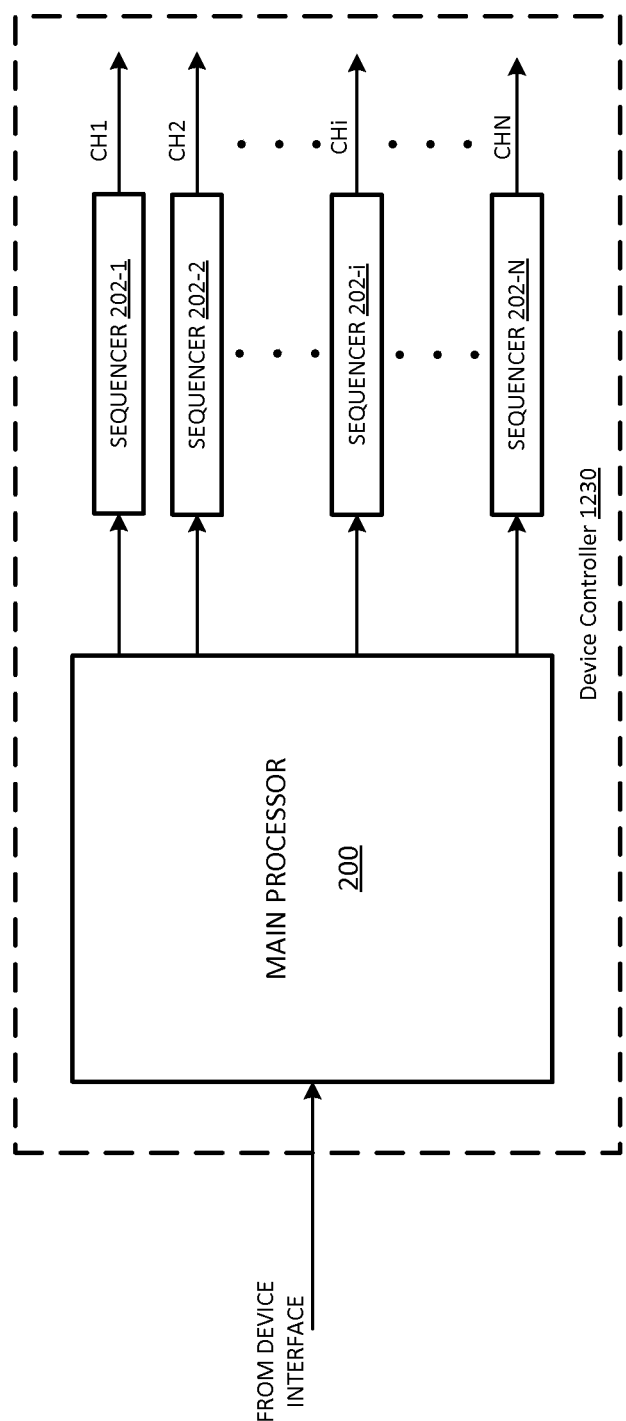
FIG. 2 is a block diagram illustrating an example embodiment of the device controller 1230 shown in FIG. 1.

FIG. 2 is a block diagram illustrating an example embodiment of the device controller 1230 shown in FIG. 1.

As mentioned similarly above, the device controller 1230 (or one or more components thereof) may be hardware, firmware, hardware executing software or any combination thereof. When the device controller 1230 is hardware, such hardware may include one or more Central Processing Units (CPUs), digital signal processors (DSPs), application-specific-integrated-circuits (ASICs), field programmable gate arrays (FPGAs), systems-on-chip (SoCs) computers or the like configured as special purpose machines to perform the functions of the device controller 1230. CPUs, DSPs, ASICs and FPGAs may generally be referred to as processors and/or microprocessors.

In the event that the device controller 1230 (or one or more components thereof) is a processor executing software, the processor may be configured as special purpose machine to execute the software to perform the functions of the device controller 1230. In such an embodiment, the device controller 1230 may include one or more CPUs, DSPs, ASICs, FPGAs, SoCs, computers, etc.

Referring to FIG. 2, the device controller 1230 includes a main processor (or processing circuit) 200 and a plurality of sequencers 202-1, 202-2, . . . , 202-$i$, . . . , 202-N. Each of the plurality of (e.g., N number of) sequencers 202-1, 202-2, . . . , 202-$i$, . . . , 202-N corresponds to one of a plurality of (e.g., N number of) channels CH1, CH2, . . . , CH$i$, . . . , CHN of the non-volatile memory 1210.

In at least this example embodiment, as with the device controller 1230 itself, the plurality of sequencers 202-1 through 202-N may be hardware, firmware, hardware executing software or any combination thereof. When the plurality of sequencers 202-1 through 202-N are hardware, such hardware may include one or more CPUs, DSPs, ASICs, FPGAs, SoCs, computers, or the like configured as special purpose machines to perform the functions of the plurality of sequencers 202-1 through 202-N.

In one example, the main processor 200 receives read and/or write commands from the host interface 1101 via the device interface 1201, and separates (or splits) each of the larger memory commands into smaller commands (also referred to as atoms or atom commands). In one example, the main processor 200 splits each larger multi-sector write command into a plurality of 1-sector-write-atoms. Each 1-sector-write-atom is a sector write command that applies to one sector of the non-volatile memory 1210. Similarly, the main processor 200 splits each larger multi-sector read command into a plurality of 1-sector-read-atoms. Each 1-sector-read-atom is a sector read command that applies to one sector of the non-volatile memory 1210.

In another example, the main processor 200 initiates maintenance of the storage device 1200. As is known, maintenance involves copying valid data from, and eventually erasing, a memory block, which generally accommodates few hundreds of sectors. In this example, the main processor 200 splits each maintenance command into multiple atoms, wherein the multiple atoms include a plurality of 1-sector-read-atoms, a plurality of 1-sector-write-atoms and a 1-block-erase-atom. In this example, each of the 1-sector-read-atom, the 1-sector-write-atom, and the block-erase-atom may also be referred to as an atom (or atom command).

Still referring to FIG. 2, the main processor 200 distributes (or allocates) the atom commands among the plurality of sequencers 202-1 through 202-N and channels CH1 through CHN of the non-volatile memory 1210. In one example, the main processor 200 distributes the atom commands of one or more larger commands (e.g., read, write, maintenance, etc.) among the plurality of sequencers 202-1 through 202-N and channels CH1 through CHN of the non-volatile memory 1210 such that each of the plurality of sequencers 202-1 through 202-N receives a set of atom commands $L_i$, where i is an index representing an i-th sequencer and channel among the plurality of sequencers 202-1 through 202-N and corresponding channels CH1 through CHN. Accordingly, the index i may take values between 1 and N. The set of atom commands $L_i$ received at each of the plurality of sequencers 202-1 through 202-N may include one or more atom commands from one or more of the larger commands separated into atom commands by the main processor 200. As discussed herein, the set of larger memory commands having at least one atom command in the set of atom commands $L_i$ may be referred to as $CMD_i$. In one example, the main processor 200 may allocate the atom commands among the plurality of channels CH1 through CH$i$ by performing load balancing to balance the load among the plurality of channels of the non-volatile memory. Because load balancing algorithms are generally well-known, a detailed discussion is omitted.

Upon receipt of a respective set of atom commands $L_i$, each of the plurality of sequencers 202-1 through 202-N independently adjusts the order of (e.g., re-orders) the atom commands included in the set of atom commands $L_i$ for execution by the non-volatile memory 1210. The re-ordered atom commands are then output to the non-volatile memory 1210 for execution in the adjusted order. A more detailed discussion of example operation of the plurality of sequencers will be provided below with regard to FIGS. 3 through 5.

Figure 3:
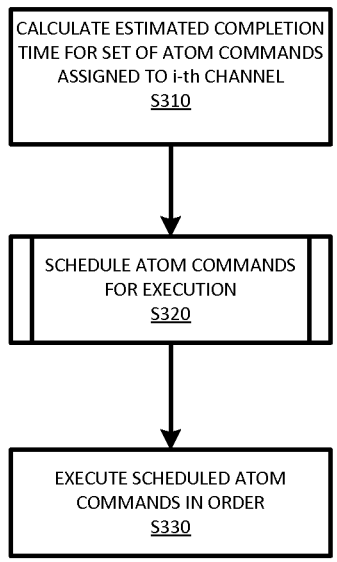
FIG. 3 is a flow chart illustrating an example embodiment of a method for executing a set of commands allocated to a sequencer of a non-volatile memory.
Figure 4:
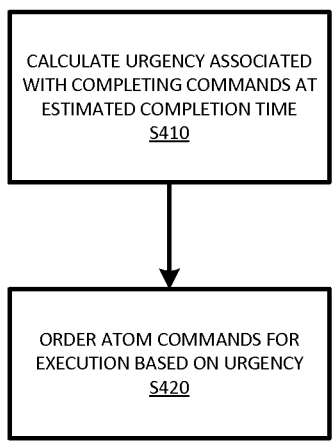
FIG. 4 is a flow chart illustrating an example embodiment of a method for scheduling commands for execution at a sequencer of a non-volatile memory.

FIG. 3 is a flow chart illustrating an example embodiment of a method for executing a set of atom commands $L_i$ allocated to the i-th sequencer 202-$i$ and corresponding i-th channel CH$i$ of the non-volatile memory 1210. FIG. 4 is a flow chart illustrating 5320 in FIG. 3 in more detail. The method shown in FIG. 4 may also be referred to as a method for scheduling commands (e.g., atoms or atom commands) for execution.

Throughout the discussion of FIGS. 3 and 4, reference will be made to FIG. 5, which illustrates an example reordering of atom commands for an i-th channel CH$i$ of the non-volatile memory 1210.

Although FIGS. 3 through 5 will be described with regard to the i-th sequencer 202-$i$ and corresponding i-th channel CH$i$, each of the plurality of sequencers 202-1 through 202-N may perform the same or substantially the same method with regard to sets of atom commands allocated to the respective sequencers 202-1 through 202-N and channels CH1 through CHN.

Referring to FIG. 3, upon receiving the allocated/assigned set of atom commands $L_i$ from the main processor 200, at S310 the i-th sequencer 202-$i$ calculates an estimated completion time for the set of atom commands $L_i$ based on a minimum time required to complete all atom commands in the set of atom commands $L_i$ allocated to the i-th sequencer 202-$i$. As mentioned above, the set of larger commands including those larger commands having at least one atom command in the set of atoms $L_i$ is referred to as $CMD_i$.

Figure 5:
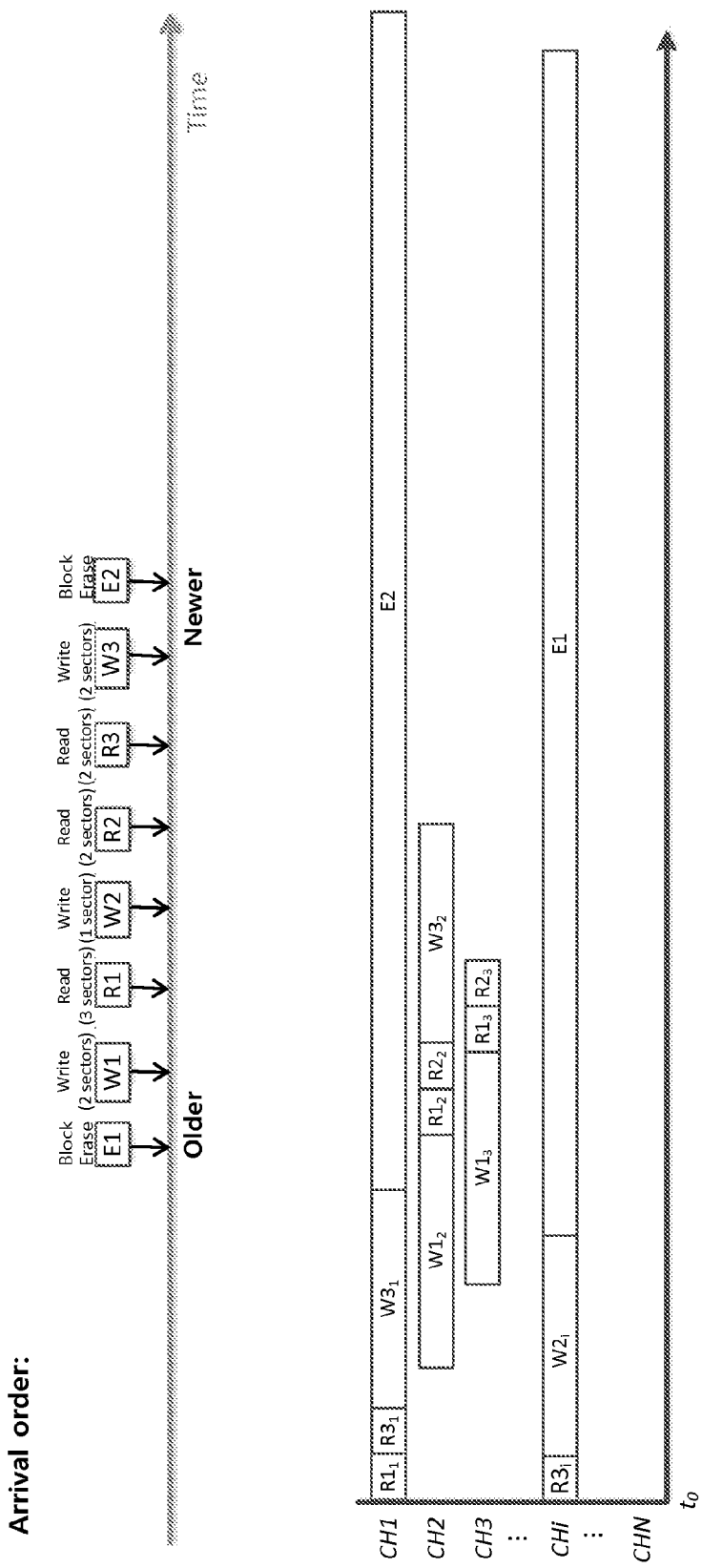
FIG. 5 illustrates an example reordering of commands for a channel of a non-volatile memory.

With reference to the example shown in FIG. 5, the main processor 200 has a set of larger commands for execution by the non-volatile memory 1210. In this example, the set of larger commands includes: block erase commands E1 and E2; write commands W1, W2 and W3; and read commands R1, R2 and R3. The write command W2 is a one sector write command; the write commands W1 and W3 are two sector write commands; the read command R1 is a three sector read command; the read commands R2 and R3 are two sector read commands; and the erase commands E1 and E2 are block erase commands. In this example, the main processor 200 receives the set of larger commands in the order: E1, W1, R1, W2, R2, R3, W3, E2.

In this example, the main processor 200 splits each of the write commands W1 and W3 into two 1-sector-write-atoms. The main processor 200 splits the read command R1 into three 1-sector-read-atoms, splits the read command R2 into two 1-sector-read-atoms, and splits the read command R3 into two 1-sector-read-atoms. Since the write command W2 is a single sector write command, the main processor 200 need not split the write command W2 into smaller atom commands.

The main processor 200 then distributes (or allocates) the smaller atom commands among the plurality of channels CH1, CH2, CH3, and CHi of the non-volatile memory 1210 as shown in FIG. 5.

In the example embodiment shown in FIG. 5, the main processor 200 allocates the atom commands as follows:

The main processor 200 allocates and outputs 1-sector-read-atom $R1_1$, 1-sector-read-atom $R3_1$, 1-sector-write-atom $W3_1$, and the block erase command E2 to the first channel CH1;

The main processor 200 allocates and outputs 1-sector-write-atom $W1_2$, 1-sector-read-atom $R1_2$, 1-sector-read-atom $R2_2$, and 1-sector-write-atom $W3_2$ to the second channel CH2;

The main processor 200 allocates and outputs 1-sector-write-atom $W1_3$, 1-sector-read-atom $R1_3$, and 1-sector-read-atom $R2_3$ to the third channel CH3; and The main processor 200 allocates and outputs 1-sector-read-atom $R3_i$, 1-sector-write-atom $W2_i$, and the block erase command E1 to the i-th channel CHi.

Thus, in the example shown in FIG. 5, the set of atom commands $L_i$ allocated to the i-th sequencer 202-i and corresponding channel CHi includes: the 1-sector-read-atom $R3_i$; the 1-sector-write-atom $W2_i$; and the block erase command E1. The set of larger commands $CMD_i$ corresponding to the set $L_i$ includes: read command R3; write command W2; and block erase command E1.

Upon receipt, the i-th sequencer 202-i calculates an estimated (e.g., worst-case) completion time $t_{WC}$ for the set of atom commands $L_i$ by aggregating (summing) the time required to complete each of the atom commands in the set of atom commands $L_i$. Thus, the estimated (e.g., worst-case) completion time $t_{WC}$ for the set of atom commands $L_i$ is an estimate of the minimum time required to complete all of the atom commands in the set of atom commands $L_i$. In this case, the estimated completion time $t_{WC}$ is the lower bound to a best case scenario for execution of the atom commands in the set $L_i$ because: (i) newly assigned atom commands may load up the i-th channel CHi during the time between $t_0$ and $t_{WC}$; and (ii) the load on another channel may be a bottleneck for completion of all host commands that are currently being executed.

With regard to the specific example shown in FIG. 5, the i-th sequencer 202-i calculates the estimated completion time $t_{WC}$ by aggregating the minimum time required to complete each of the atom commands allocated to the i-th channel CHi, as shown below in Equation (1).

$$t_{WC} = T_{W2,i} + T_{R3,i} + T_{E1,i} \quad (1)$$

In Equation (1), $T_{W2,i}$ is the total minimum time required to complete all atom commands of the write command W2 assigned to the i-th channel CHi. In the example shown in FIG. 5, $T_{W2,i}$ is the total minimum time required to complete atom command $W2_i$. Similarly, $T_{R3,i}$ is the total minimum time required to complete all atom commands of the read command R3 assigned to the i-th channel CHi. In the example shown in FIG. 5, $T_{R3,i}$ is the total minimum time required to complete atom command $R3_i$. The time $T_{E1,i}$ is the total minimum time required to complete the block erase command E 1.

More generally, if $T_{k,i}$ denotes the minimum time required to fully complete execution of all atoms of a k-th larger command in the set of larger commands $CMD_i$, which are assigned to the i-th channel CHi, then the i-th sequencer 202-i calculates the estimated completion time $t_{WC}$ for the set of atom commands $L_i$ by summing the minimum time $T_{k,i}$ for each of the k-th larger commands in the set of larger commands $CMD_i$, according to Equation (2) shown below:

$$t_{WC} = \Sigma T_{k,i} \quad (2)$$

In Equation (2), $\Sigma$ runs over all k while i is fixed.

Returning to the example shown in FIG. 5, as mentioned above, the set of commands $CMD_i$ in this example includes: write command W2; read command R3; and block erase command E1.

In Equation (2), assuming parallelism of execution is neglected, the minimum completion time $T_{k,i}$ for all atom commands of a k-th larger command that are assigned to the i-th channel CHi may be calculated based on a time required to execute each atom command s of the k-th larger command and the number of atom commands of the k-th larger command, which are assigned to the i-th channel CHi. If $S_{k,i}$ denotes the number of atom commands of the k-th larger command assigned to the i-th channel CHi, and $T_s$ refers to the time required to execute an atom command s of the k-th larger command, then the minimum completion time $T_{k,i}$ may be calculated as shown below in Equation (3).

$$T_{k,i} = T_s \times S_{k,i} \quad (3)$$

With regard to the read command R3 in the specific example provided in FIG. 5, if the time required to complete respective 1-sector-read-atoms $R3_1$ and $R3_i$ is denoted $T_{sR3}$, then the minimum completion time $T_{R3,i}$ for the read command R3 with regard to the i-th channel CHi is $T_{sR3} \times 1$ (i.e., $T_{R3,i} = T_{sRS} \times 1$) since only one atom command of the read command R3 is assigned to the i-th channel CHi.

If the time required to complete the 1-sector-write-atom $W2_i$ is denoted $T_{sW2}$, then the minimum completion time $T_{W2,i}$ is $T_{sW2} \times 1$ (i.e., $T_{W2,i} = T_{sW2} \times 1$) since only one atom command of the write command W2 is assigned to the i-th channel CHi.

If the time required to complete a block-erase-atom of the block erase command E1 is denoted $T_{sE1}$, then the minimum completion time $T_{E1,i}$ is $t_{sE1} \times 1$ (i.e., $T_{E1,i} = T_{sE1} \times 1$) since only one block-erase-atom is assigned to the i-th channel CHi.

As shown in Equation (1), and more generally in Equation (2), the estimated completion time $t_{WC}$ is calculated by aggregating the minimum times required to complete execution of all the atom commands assigned to the i-th channel CHi.

Returning to FIG. 3, at S320 the i-th sequencer 202-i then schedules the plurality of atom commands in the set of atom commands $L_i$ by re-ordering the plurality of atom commands based on the estimated completion time $t_{WC}$. In so doing, the i-th sequencer 202-i adjusts the order of execution of the atom commands in the set of atom commands $L_i$. The scheduling at S320 in FIG. 3 will be discussed in more detail below with regard to FIGS. 4 and 5.

As mentioned above, FIG. 4 is a flow chart illustrating S320 in FIG. 3 in more detail.

Referring to FIG. 4, at S410 the i-th sequencer 202-i estimates an urgency (also referred to as a future urgency or cost) value associated with the l-th atom command the set of atom commands $L_i$ as a function of (i) the minimum completion time $T_k$ required to fully complete the k-th larger command corresponding to the l-th atom command; and (ii) a worst-case response time $D_{k,t_{WC}}$ for the k-th larger command. The worst-case response time $D_{k,t_{WC}}$ refers to a duration of time (or time interval) between acceptance of the k-th larger command at the device controller 1230 and the estimated completion time $t_{WC}$. As is known, a response time for a command request is measured as the time between acceptance of a command request at a device controller and the time at which the device controller responds to the host with a successful completion (e.g., "OK") message.

In one example, the minimum completion time Tk required to fully complete a k-th larger command may be calculated based on a time required to execute each atom command s of the k-th larger command and the number of atom commands making up the k-th larger command.

In one example, if $S_k$ is used to denote the total number of atom commands making up the k-th larger command, and $T_s$ again refers to the time required to execute an atom command s of the k-th larger command, then the minimum completion time $T_k$ may be calculated according to Equation (4) shown below.

$$T_k = T_s \times S_k \qquad (4)$$

With regard to FIG. 5, for example, since the total number of atom commands for the read command R3 is two (i.e., $S_k$=2), the minimum completion time $T_{R3}$ required to fully complete the larger read command R3 is given by $T_{R3} = T_{sR3} \times 2$.

In one example, the i-th sequencer 202-*i* may calculate the worst-case response time $D_{k,t_{WC}}$ for a k-th larger command corresponding to the l-th atom command in the set of atom commands $L_i$ according to Equation (5) shown below.

$$D_{k,t_{WC}} = t_{WC} - t_{k,0} \qquad (5)$$

In Equation 4, $t_{k,0}$ is the time of acceptance of the k-th larger command at the device controller 1230. Thus, the worst-case response time is calculated based on the estimated completion time $t_{WC}$ calculated at S310 and the time of acceptance of the command $t_{k,0}$.

The i-th sequencer 202-*i* may then estimate an urgency value Urgency(l, $t_{WC}$) associated with the l-th atom command in the set of atom commands $L_i$ based on the minimum completion time $T_k$ required to fully complete the k-th larger command corresponding to the l-th atom command, and the worst-case response time $D_{k,t_{WC}}$ for the k-th larger command corresponding to the l-th atom command, as shown below in Equation (6).

$$\text{Urgency}(l, t_{WC}) = \frac{D_{k,t_{WC}}}{T_k} \qquad (6)$$

In Equation (6), l represents the l-th atom in the set of atoms $L_i$.

With regard to Equation (6), if the ratio of $D_{k,t_{WC}}$ to $T_k$ is greater than a threshold value (e.g., about 30×$T_k$), then the ratio $$\frac{D_{k,t_{WC}}}{T_k}$$

may be squared to obtain the urgency Urgency(l, $t_{WC}$) for the l-th atom command in the set of atom commands $L_i$.

For a given atom command, the calculated urgency value is an urgency value associated with completing execution of a corresponding larger memory command after expiration of the time interval required to complete execution of all atom commands in the set of atom commands $L_i$.

According to at least some example embodiments, the urgency for an l-th atom command may be estimated as a ratio of time intervals, wherein the first time interval is an interval between a reception time of a k-th larger command at the storage device and an estimated completion time $t_{WC}$ for the set of all atom commands $L_i$ assigned to the i-th channel CHi, and the second interval is a minimum completion time $T_k$ required to fully complete the k-th larger command corresponding to the l-th atom command.

Returning to the specific example shown in FIG. 5, for the atom commands allocated to the i-th channel CHi, the worst-case response time $D_{R3,t_{WC}}$ for the read command R3 is given by $D_{R3,t_{WC}} = t_{WC} - T_{R3,0}$, and the urgency value Urgency(R3$_i$,$t_{WC}$) associated with the atom command R3$_i$ is given by $$\text{Urgency}(R3_i, t_{WC}) = \frac{D_{R3,t_{WC}}}{T_{R3}}.$$

The worst-case response time $D_{W2,t_{WC}}$ for the write command W2 is given by $D_{W2,t_{WC}} = t_{WC} - t_{W2,0}$, and the urgency value Urgency(W2$_i$,$t_{WC}$) associated with the atom command W2$_i$ is given by $$\text{Urgency}(W2_i, t_{WC}) = \frac{D_{W2,t_{WC}}}{T_{W2}}.$$

Finally, the worst-case response time $D_{E1,t_{WC}}$ for the block erase command E1 is given by $D_{E1,t_{WC}} = t_{WC} - t_{E1,0}$, and the urgency value Urgency(E1,$t_{WC}$), associated with the block erase command E1 is given by $$\text{Urgency}(E1, t_{WC}) = \frac{D_{E2,t_{WC}}}{T_{E2}}.$$

For a maintenance request M, which as discussed above, involves copying (e.g., reading and writing) all valid pages from a victim block and then erasing the block, the urgency value associated with the maintenance request M may also be based on a measure of shortage of free sectors to write at time t. If $D_{M,t_{WC}}$ is used to denote a worst-case response time for the maintenance command M (e.g., a duration between acceptance of the maintenance request M at the device controller 1230 and an estimated completion time $t_{WC}$ calculated as discussed above), and $C_t$ is a measure of shortage of free sectors to write at time t, then the urgency for an atom command of a maintenance command M may be calculated according to Equation (7) shown below.

$$\text{Urgency}(M, t_{WC}) = D_{M,t_{WC}} \times C_r \qquad (7)$$

The cost or urgency value Urgency(Mm,$t_{WC}$)=$D_{M,t_{WC}} \times C_t$ may not be squared similar to the urgency value associated with a read/write command as discussed above.

In Equation (7), C(t) is a fixed reasonable measure of the urgency value at time t. In one example, $C_t$ is reasonable if it monotonically rises (e.g., linearly, squared or otherwise) as time passes and is inversely proportional to the magnitude of the larger command (e.g., 1 millisecond delay may be more acceptable for a 10 sectors command than for a 1 sector command).

In a well-designed controller, if to is the point in time the maintenance command M was initiated, C(t=$t_0$) should be about zero and rise monotonically as time passes and as shortage of write space increases. When the sequencer decides which of its assigned atoms needs the resource for execution, the sequencer takes $t=t_{WC}$, and thus Urgency(M, $t_{WC}$)=D(M,$t_{WC}$)×C($t_{WC}$).

Returning now to FIG. 4, at step S420 the i-th sequencer 202-$i$ schedules the plurality of atom commands in the set of atom commands $L_i$ for execution by the non-volatile memory 1210 by ordering the plurality of atom commands in the set $L_i$ for execution based on the estimated urgency values calculated at S410.

In one example, the i-th sequencer 202-$i$ schedules the plurality of atom commands in the set of atom commands $L_i$ for execution by adjusting execution priorities associated with the plurality of atom commands based on the estimated urgency values calculated at S410, and ordering the plurality of atom commands for execution based on the adjusted execution priorities. In one example, if no new atom commands join the queue for execution at the i-th sequencer 202-$i$, the atom command in the set of atom commands $L_i$ having the highest future ($t_{WC}$) Urgency Value May be Assigned the highest execution priority, the atom command in the set of atoms $L_i$ having the second highest urgency value may be assigned the second highest execution priority, and so on.

As new atom commands join the queue for execution at the i-th sequencer 202-$i$, the next moment the resource is free, the calculations may be repeated again with the new set of atom commands $L_i$ after the new atom commands are added to the set. The new set of atom commands $L_i$ contains at least one less atom (the one just executed) and at least one new atom (the one who joined the set). Hence, $t_{WC}$ may be recalculated or updated, rather than being fully recalculated.

The order of urgencies (most urgent vs. less urgent) calculated for the previously estimated completion time $t_{WC}$ changes with the new estimated completion time $t_{WC}$ because the pace at which urgency values rise differs among atom commands. For instance, atom commands of smaller parent host commands rise in urgency faster than atom commands of larger memory commands. This dynamicity lies at the heart of need for out-of-order execution.

Referring again back to the specific example shown in FIG. 5, for the atom commands allocated to the i-th sequencer 202-$i$ and channel CHi, if the urgency value Urgency(R3$_i$,$t_{WC}$) is 380, the urgency value Uregncy(W2$_i$, $t_{WC}$) is 121, and the urgency value Urgency(E1, $t_{WC}$) is 58, then the atom command R3$_i$ may be assigned the highest execution priority, the atom command W2$_i$ may be assigned the next highest execution priority, and the block erase E1 may be assigned lowest execution priority. The i-th sequencer 202-$i$ re-orders these atom commands from the order in which the larger commands were received from the host 1100 (i.e., E1→W2$_i$→R3$_i$) to the order R3$_i$→W2$_i$→E1 as shown in FIG. 5.

The i-th sequencer 202-$i$ may assign execution priorities based on a comparison of the estimated urgency values for the plurality of atom commands in the set of atom commands $L_i$ at the estimated completion time $t_{WC}$, and then schedule the plurality of atom commands based on this comparison.

In another example, the i-th sequencer 202-$i$ may order the plurality of atom commands in the set of atom commands $L_i$ such that the atom commands are executed in descending order from the atom command having the highest associated estimated urgency value to the atom command having the lowest associated estimated urgency value.

Returning now to FIG. 3, after scheduling the plurality of atom commands in the set of atom commands $L_i$ for execution by the non-volatile memory 1210, at S330 the non-volatile memory 1210 executes the plurality of atom commands in the set of atom commands $L_i$ in the scheduled order. For example, with regard to the atom commands allocated to the i-th sequencer 202-$i$ and channel CHi in the specific example shown in FIG. 5, the non-volatile memory 1210 (or storage device 1200) executes the atom commands in the order R3$_i$→W2$_i$→E1.

According to at least some example embodiments, atom commands allocated to specific channels of a non-volatile memory are re-ordered for execution based on an urgency (or cost) value predicted based on the assumption that execution of the corresponding larger commands is fully completed at a time corresponding to a worst-case scenario, rather than the time at which the larger commands are received and/or accepted by the non-volatile memory. The atom commands allocated to each channel may be re-ordered independently and/or without regard to an order of the atom commands at other sequencers.

Figure 6:
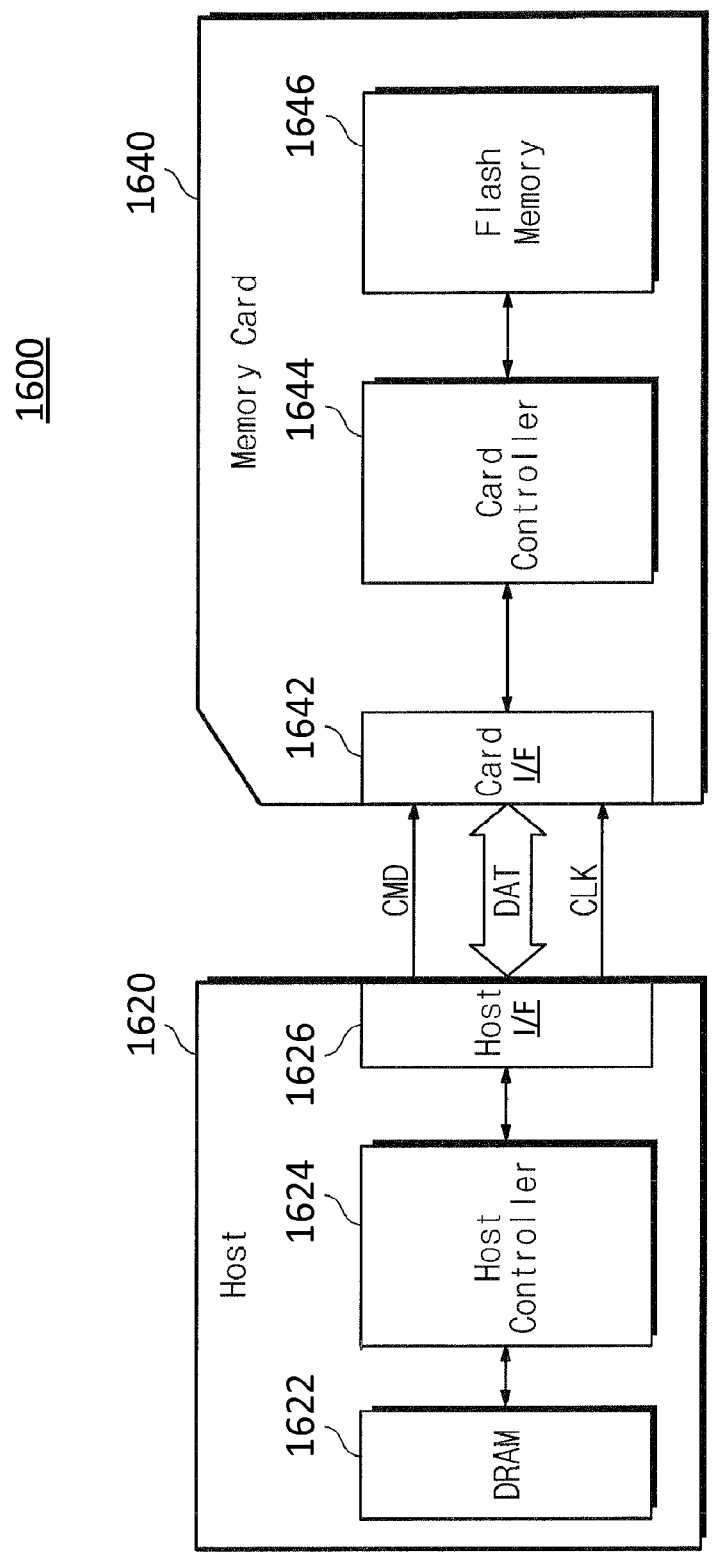
FIG. 6 is a block diagram illustrating a memory card system including a storage device according to an example embodiment.

FIG. 6 is a block diagram illustrating a memory card system including a storage device according to an example embodiment.

Referring to FIG. 6, a memory card system 1600 includes a host 1620 and a memory card 1640. The host 1620 includes a host controller 1624, a host interface 1626, and a DRAM 1622.

The host 1620 writes data to the memory card 1640 and/or reads data from the memory card 1640. The host controller 1624 sends a command CMD (e.g., a write command), a clock signal CLK generated from a clock generator (not shown) in the host 1620, and data DAT to the memory card 1640 via the host interface 1626. The DRAM 1622 may be a main memory of the host 1620.

The memory card 1640 includes a card interface 1642, a card controller 1644, and a flash memory 1646. The card controller 1644 stores data at the flash memory 1646 in response to a command input via the card interface 1642. The data may be stored in synchronization with the clock signal CLK generated from the clock generator (not shown) in the card controller 1644. The flash memory 1646 stores data transferred from the host 1620.

The card controller 1644 may include, or be implemented as, the device controller 1230 discussed above with regard to FIG. 2. Accordingly, the card controller 1644 may operate in accordance with example embodiments to reorder commands for execution at the flash memory 1646.

Figure 7:
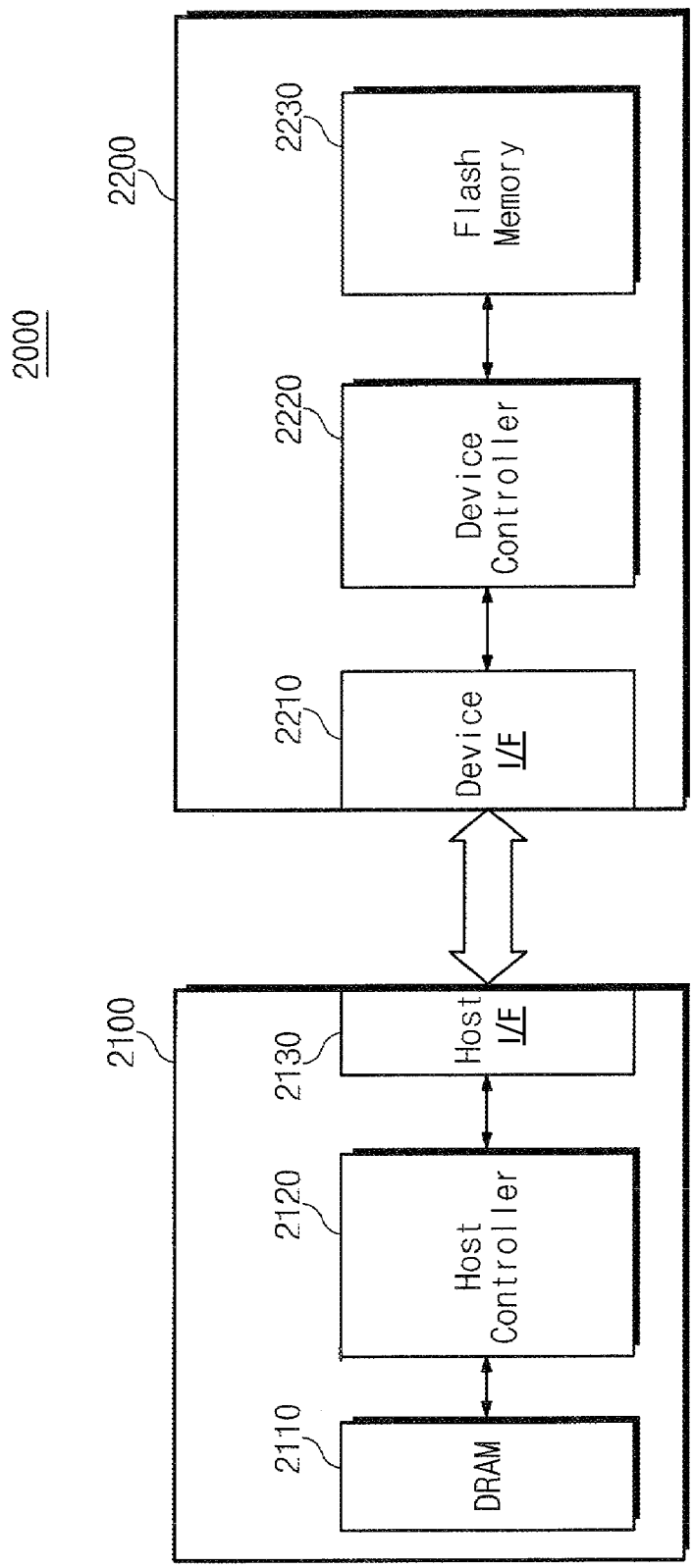
FIG. 7 is a block diagram illustrating a Universal Flash Storage (UFS) system in which a storage device according to an example embodiment may be implemented.

FIG. 7 is a block diagram illustrating a Universal Flash Storage (UFS) system in which a non-volatile memory device according to an example embodiment may be implemented.

Referring to FIG. 7, a UFS system 2000 includes a UFS host 2100 and a UFS device 2200. The UFS host 2100 includes a host controller 2120, a host interface 2130, and a DRAM 2110.

The UFS host 2100 writes data in the UFS device 2200 and/or reads data from the UFS device 2200. The DRAM 2110 may be a main memory of the UFS host 2100. The UFS host 2100 communicates with the UFS device 2200 via the host interface 2130 and a device interface 2210 of the UFS device 2200.

The UFS device 2200 includes the device interface 2210, a device controller 2220, and a flash memory 2230. The device controller 2220 stores data at the flash memory 2230 in response to a command input via the device interface 2210. The flash memory 2230 stores data transferred from the UFS host 2100.

The device controller 2220 may include, or be implemented as, the device controller 1230 discussed above with regard to FIG. 2. Accordingly, the device controller 2220 may operate in accordance with example embodiments to reorder commands for execution at the flash memory 2230.

Figure 8:
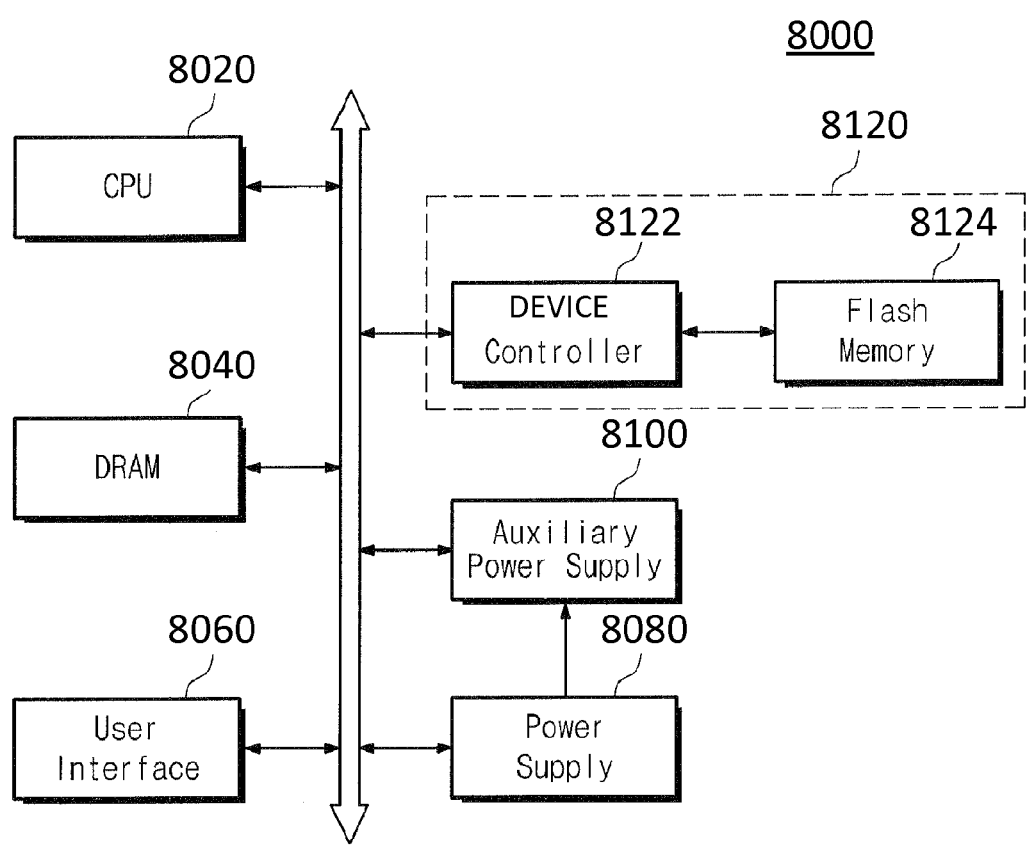
FIG. 8 is a block diagram illustrating an electronic device in which a storage device according to an example embodiment may be implemented.

FIG. 8 is a block diagram illustrating an electronic device including a memory device according to an example embodiment. Herein, an electronic device may be a personal computer or a handheld electronic device such as a notebook computer, a cellular phone, a personal digital assistant (PDA), a camera, or the like.

Referring to FIG. 8, the electronic device 8000 includes: a memory device 8120; a power supply device 8080; an auxiliary power supply 8100; a CPU 8020; a DRAM 8040; and a user interface 8060. The memory device 8120 includes a flash memory 8124 and a device controller 8122. The memory device 8120 may be built in the electronic device 8000.

The device controller 8122 may include, or be implemented as, the device controller 1230 discussed above with regard to FIG. 2. Accordingly, the device controller 8122 may operate in accordance with example embodiments to reorder commands for execution at the flash memory 8124.

Figure 9:
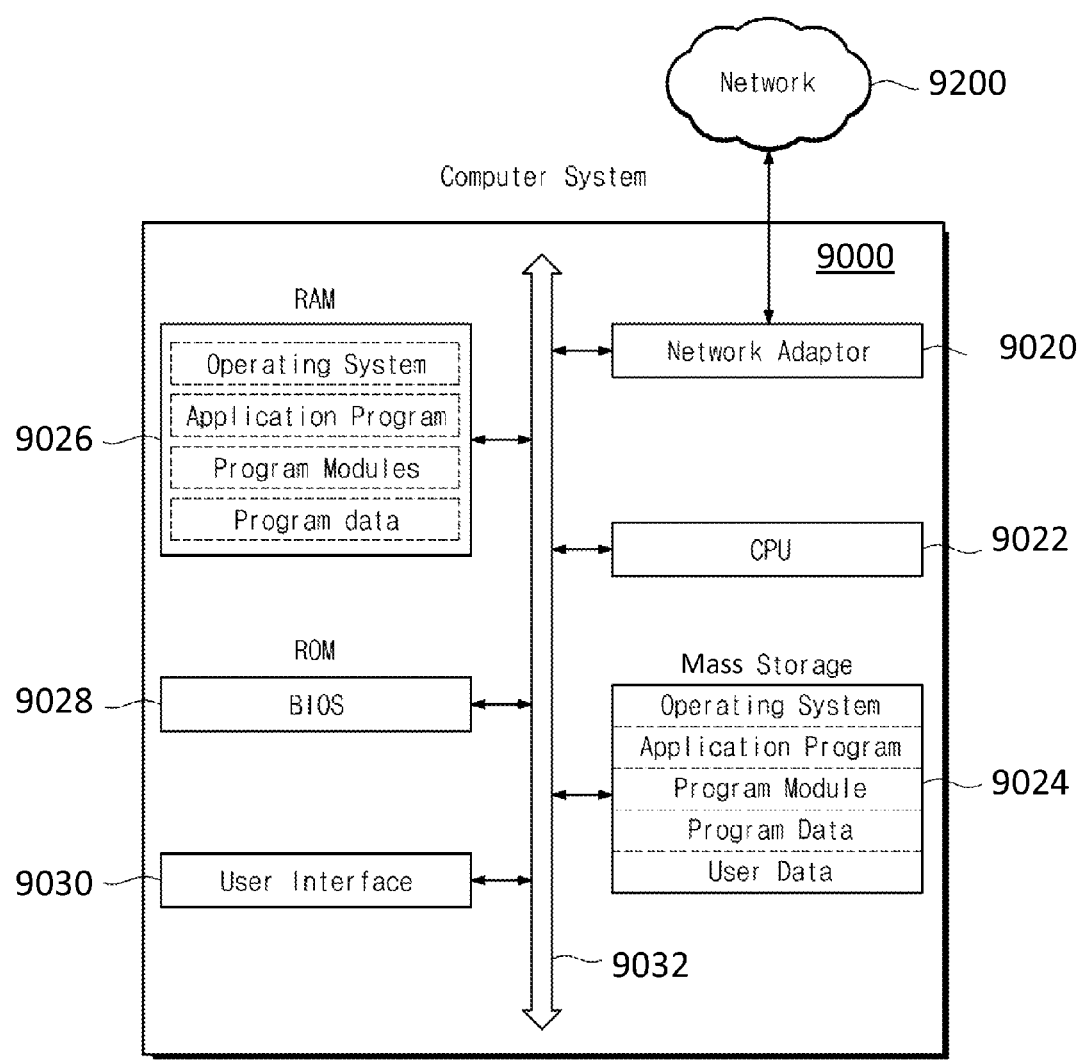
FIG. 9 is a block diagram schematically illustrating a computing system including a storage system according to an example embodiment.

FIG. 9 is a block diagram schematically illustrating a computing system including a storage device according to an example embodiment.

Referring to FIG. 9, a computing system 9000 includes: a network adaptor 9020; a central processing unit (CPU) 9022; a mass storage device 9024; a RAM 9026; a ROM 9028; and a user interface 9030. The components of the computing system 9000 are connected by a system bus 9032.

The network adaptor 9020 provides an interface between the computing system 9000 and external networks 9200. The CPU 9022 controls an overall operation for driving an operating system and an application program which are resident on the RAM 9026. The mass storage device 9024 stores data needed for the computing system 9000. For example, the mass storage device 9024 may store an operating system for driving the computing system 9000, an application program, various program modules, program data, user data, etc.

The RAM 9026 is used as a working memory of the computing system 9000. Upon booting, the operating system, the application program, the various program modules, and program data needed to drive programs and various program modules read out from the mass storage device 9024 may be loaded into the RAM 9026. The ROM 9028 stores a basic input/output system (BIOS), which is activated before the operating system is driven upon booting. Information exchange between the computing system 9000 and a user may be made via the user interface 9030.

In addition, the computing system 9000 may further include a battery, a modem, and the like. Although not shown, the computing system 9000 may further include an application chipset, a camera image processor (CIS), a mobile DRAM, and the like.

The mass storage device 9024 may include a non-volatile storage device according to one or more example embodiments discussed herein. For example, the mass storage device 9024 may include the storage device 1200 shown in FIG. 1 and/or the device controller 1230 shown in FIG. 2. The mass storage device 9024 may be implemented by a solid state drive, a multimedia card (MMC), a secure digital (SD) card, a micro SD card, a memory stick, an ID card, a PCMCIA card, a chip card, an USB card, a smart card, a compact flash (CF) card, etc.

Figure 10:
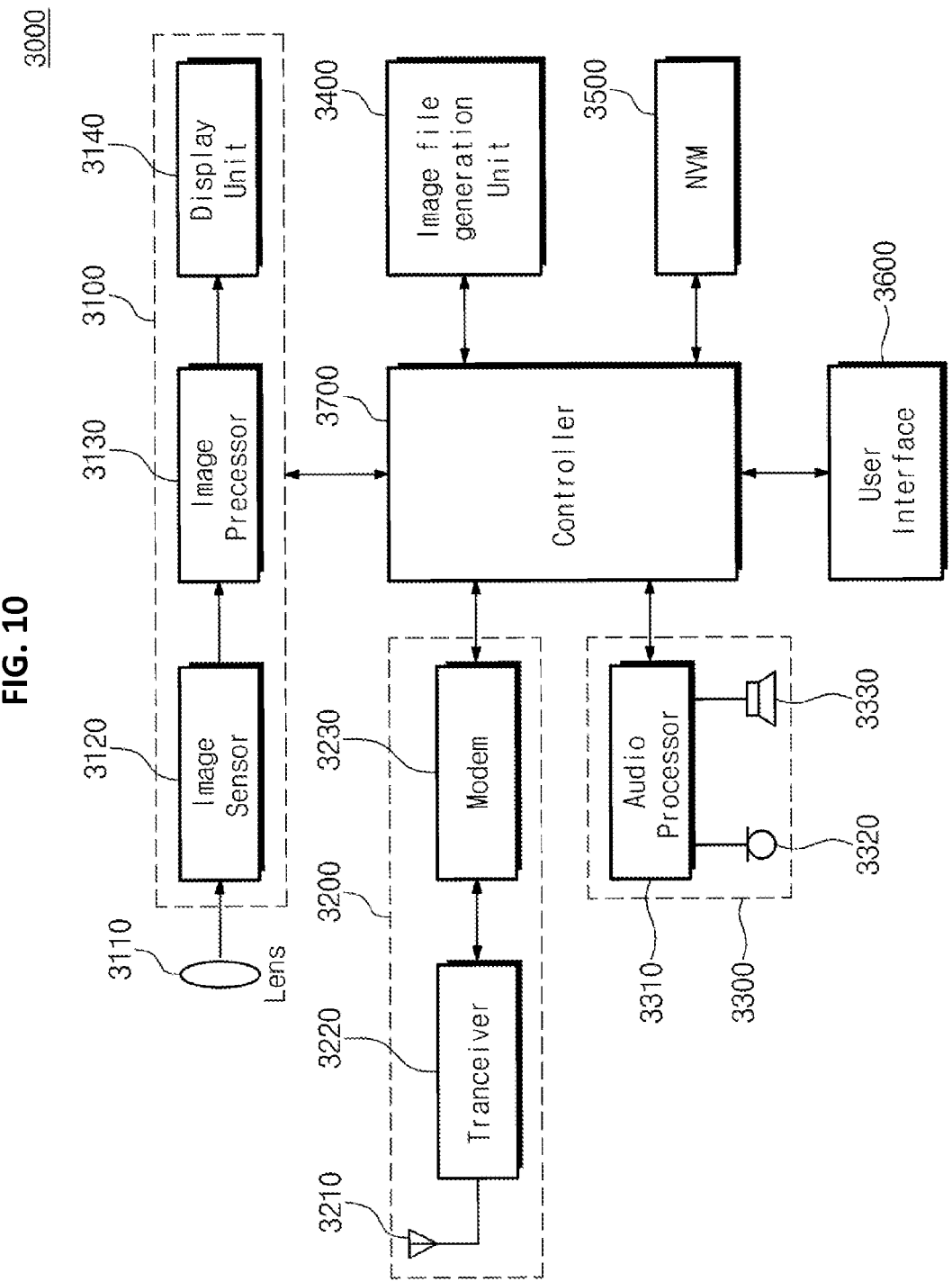
FIG. 10 is a block diagram schematically illustrating a handheld terminal including a storage device according to an example embodiment.

FIG. 10 is a block diagram schematically illustrating a handheld terminal according to an example embodiment.

Referring to FIG. 10, a handheld terminal 3000 includes: an image processing circuit 3100; a wireless transceiver circuit 3200; an audio processing circuit 3300; an image file generating circuit 3400; a non-volatile memory device 3500; a user interface 3600; and a controller 3700.

The image processing circuit 3100 includes: a lens 3110; an image sensor 3120; an image processor 3130; and a display unit 3140. The wireless transceiver circuit 3200 includes: an antenna 3210; a transceiver 3220; and a modem 3230. The audio processing circuit 3300 includes: an audio processor 3310; a microphone 3320; and a speaker 3330.

In this example embodiment, the non-volatile memory device 3500 may be implemented as the storage device 1200 shown in FIG. 1 and/or the device controller 1230 shown in FIG. 2. The non-volatile memory device 3500 shown in FIG. 10 may be one of a memory system, a memory card, an SSD, an eMMC, etc.

Nonvolatile memory devices and/or memory controllers according to example embodiments of inventive concepts may be packed by according to various types of packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A memory device controller, comprising:
   a main processor configured to allocate a set of atom commands to a channel among a plurality of channels of a non-volatile memory, the set of atom commands including a plurality of atom commands, each of the plurality of atom commands being a portion of a memory command from among a plurality of memory commands, and each of the plurality of atom commands being applicable to at least one sector of the non-volatile memory; and
   a sequencer configured to,
      estimate a time interval required to complete execution of the set of atom commands allocated to the channel,
      calculate, for each of the plurality of atom commands, an urgency value associated with completing execution of a corresponding memory command after expiration of the time interval required to complete execution of the set of atom commands allocated to the channel, schedule each of the plurality of atom commands in the set of atom commands for execution by the non-volatile memory based on the calculated urgency values, and output the plurality of atom commands to the non-volatile memory for execution in the scheduled order.

2. The memory device controller of claim 1, wherein the sequencer is further configured to aggregate a minimum execution time required to complete execution of each of the plurality of atom commands in the set of atom commands to estimate the time interval required to complete execution of the set of atom commands.

3. The memory device controller of claim 1, wherein the plurality of memory commands include at least one of a write command, a read command and a maintenance command.

4. The memory device controller of claim 1, wherein the sequencer is configured to schedule the plurality of atom commands by ordering the plurality of atom commands for execution by the non-volatile memory based on the calculated urgency values.

5. The memory device controller of claim 4, wherein the sequencer is configured to schedule the plurality of atom commands by adjusting execution priorities associated with the plurality of atom commands based on the calculated urgency values, and ordering the plurality of atom commands for execution based on the adjusted execution priorities.

6. The memory device controller of claim 4, wherein the sequencer is further configured to, compare the calculated urgency values for each of the plurality of atom commands, and order the plurality of atom commands for execution based on the comparison.

7. The memory device controller of claim 6, wherein the sequencer is configured to order the plurality of atom commands for execution such that the atom command having a highest calculated urgency value, from among the plurality of atom commands, is executed first.

8. The memory device controller of claim 1, wherein the sequencer is further configured to, in response to addition of an atom command to the set of atom commands allocated to the channel, re-estimate the time interval required to complete execution of the set of atom commands allocated to the channel, re-calculate, for each of the plurality of atom commands, the urgency value associated with completing execution of the corresponding memory command after expiration of the time interval required to complete execution of the set of atom commands allocated to the channel, and re-schedule the plurality of atom commands in the set of atom commands for execution by the non-volatile memory based on the re-calculated urgency values.

9. The memory device controller of claim 1, wherein the plurality of atom commands include at least one of a sector read command, a sector write command and a block erase command.

10. The memory device controller of claim 1, wherein the sequencer is configured to schedule the plurality of atom commands in the set of atom commands allocated to the channel independent of scheduling of atom commands allocated to others of the plurality of channels of the non-volatile memory.

11. The memory device controller of claim 1, wherein the main processor is further configured to separate each of the plurality of memory commands into a plurality of atom commands.

12. A storage device comprising:

a non-volatile memory including a plurality of memory channels, the non-volatile memory being configured to execute a plurality of memory commands; and a memory device controller including a main processor configured to allocate a set of atom commands to a channel among the plurality of memory channels of the non-volatile memory, the set of atom commands including a plurality of atom commands, each of the plurality of atom commands being a portion of a memory command from among the plurality of memory commands, and each of the plurality of atom commands being applicable to at least one sector of the non-volatile memory; and a sequencer configured to, estimate a time interval required to complete execution of the set of atom commands allocated to the channel, calculate, for each of the plurality of atom commands, an urgency value associated with completing execution of a corresponding memory command after expiration of the time interval required to complete execution of the set of atom commands allocated to the channel, schedule each of the plurality of atom commands in the set of atom commands for execution by the non-volatile memory based on the calculated urgency values, and output the plurality of atom commands to the non-volatile memory for execution in the scheduled order.

13. The storage device of claim 12, wherein the non-volatile memory includes a three-dimensional memory array.

14. The storage device of claim 13, wherein the three dimensional memory array includes a plurality of memory cells, each of the plurality of memory cells including a charge trap layer.

15. A storage system comprising:

a host configured to generate memory commands; and a storage device coupled to the host, the storage device including a non-volatile memory and a memory device controller coupled to the non-volatile memory;

wherein the non-volatile memory includes a plurality of memory channels, and is configured to execute a plurality of memory commands; and wherein the memory device controller includes a main processor configured to allocate a set of atom commands to a channel among the plurality of memory channels of the non-volatile memory, the set of atom commands including a plurality of atom commands, each of the plurality of atom commands being a portion of a memory command from among the plurality of memory commands, and each of the plurality of atom commands being applicable to at least one sector of the non-volatile memory; and a sequencer configured to, estimate a time interval required to complete execution of the set of atom commands allocated to the channel, calculate, for each of the plurality of atom commands, an urgency value associated with completing execution of a corresponding memory command after expiration of the time interval required to complete execution of the set of atom commands allocated to the channel, schedule each of the plurality of atom commands in the set of atom commands for execution by the non-volatile memory based on the calculated urgency values, and output the plurality of atom commands to the non-volatile memory for execution in the scheduled order.

* * * * *